United States Patent [19]

Momiyama et al.

[11] 4,299,453
[45] Nov. 10, 1981

[54] ZOOM LENS SYSTEM WITH MOVABLE DIAPHRAGM

[75] Inventors: Kikuo Momiyama, Yokohama; Shigeru Kamata, Tokyo, both of Japan

[73] Assignee: Canon Kabushiki Kaisha, Tokyo, Japan

[21] Appl. No.: 55,073

[22] Filed: Jul. 5, 1979

[30] Foreign Application Priority Data

Jul. 6, 1978 [JP] Japan ............................. 53-82280

[51] Int. Cl.³ .......................................... G02B 15/14
[52] U.S. Cl. .................................. 350/426; 350/450
[58] Field of Search ............................ 350/426, 450

[56] References Cited

U.S. PATENT DOCUMENTS 4,185,893  1/1980  Ogawa ................. 350/184
4,190,323  2/1980  Ogawa ................. 350/184

Primary Examiner—Conrad J. Clark
Attorney, Agent, or Firm—Toren, McGeady & Stanger

[57] ABSTRACT

The present invention relates to an objective lens for zooming by varying the distance between the divergent front lens group and the convergent rear lens group consisting of a first sub-group for forming a convergent light beam and a second sub-group between which sub-groups a photographing aperture is provided so as to be independent from them, whereby when the rear lens group is displaced forward for zooming the photographing aperture is displaced backward with reference to the first sub-group.

9 Claims, 13 Drawing Figures

ZOOM LENS SYSTEM WITH MOVABLE DIAPHRAGM

BACKGROUND OF THE INVENTION

The present invention relates to a zoom lens, particularly to a photographic lens for zooming by varying the distance between two lens groups. More particularly, the zoom lens is provided with a photographing aperture movable relative to the rear lens group when the lens group is moved forwards.

Out of the zoom lenses, a two group type zoom lens consisting of a divergent front group and a convergent rear group is disclosed out of U.S. Pat. No. 3,848,969 and others. This kind of zoom lens, being a reverse telephoto type in the arrangement of the refractive power, is desirable provided it has a wide angle range, so that various kinds of improvements have been made in order to obtain a zoom lens for the wide angle range with high image quality.

Despite of the above mentioned superiority, if this type of zoom lens is zoomed toward its wide angle configuration the distance between the front group and the rear group including an aperture becomes so large that the off-axial ray passing through the front group is a large distance from the optical axis so that the diameter of the front lens has to be increased, which is inconvenient.

On the other hand, if the lens is zoomed toward its telephoto configuration, the front and the rear group are close to each other while the rear group including the aperture is moved so far to the object side that the on-axial ray passing through the aperture is a large distance from the optical axis, so that the diameter of the aperture has to be increased, which is inconvenient.

Particularly with reference to the latter problem, in order to decrease the F-number in the telephoto configuration the diameter of the aperture has to be further increased so that the lens barrel containing such an aperture control mechanism becomes unavoidably large, which is not only difficult for easy handling but also not nice to look at.

Under such circumstance, the size of the aperture control mechanism remains unchanged, while the F-number at the telephoto side is choosen larger than that at the wide angle side in order to prevent the increase of the diameter of the lens barrel. However, the F-number changes during the zooming. Thus, the photographic effect intended by the photographer often can not be obtained, which is inconvenient.

SUMMARY OF THE INVENTION

A purpose of the present invention is to offer a zoom lens with small F-number.

Another purpose of the present invention is to obtain a small F-number in the telephoto configuration during zooming.

A further purpose of the present invention is to obtain the same F-number with the same aperture diameter in the telephoto configuration as well as in the wide angle configuration during the zooming.

A further purpose of the present invention is to decrease the F-number of the lens without increasing the size of the lens barrel.

For this purpose, the zoom lens is constituted with a front lens group and a rear lens group in such a manner that during the zooming a photographing aperture is moved relative to the rear lens group. When in the conventional zoom lens the aperture is moved together with the rear lens group the marginal ray is distant from the optical axis at the position of the aperture, while in accordance with the present invention the diameter of the light beam can be controlled at the position at which the marginal ray is close to the optical axis. Further, it is possible that the principal ray is incident upon the front lens group at the position comparatively close to be optical axis.

DESCRIPTION OF THE PREFERRED EMBODIMENTS

Figure 1:
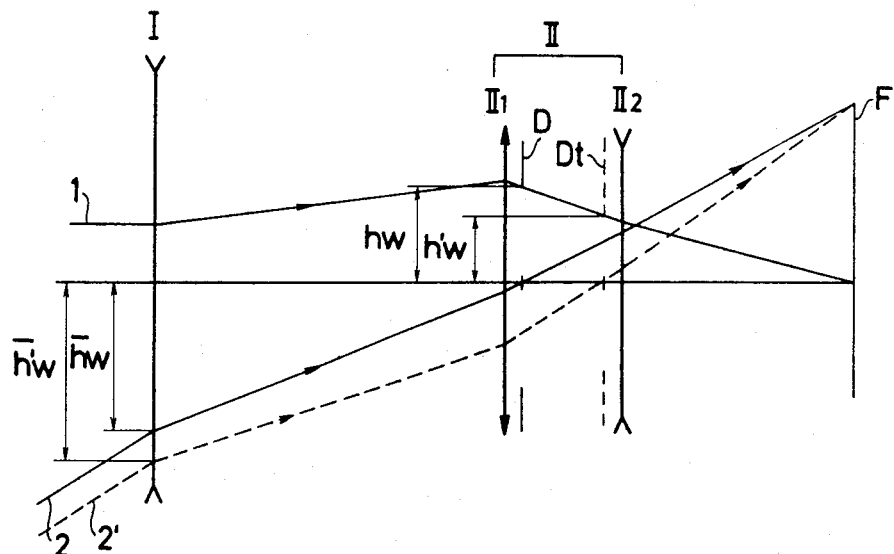
FIG. 1 shows a side view of an embodiment of the present invention in the wide angle configuration, whereby a thin-lens system is used.
Figure 2:
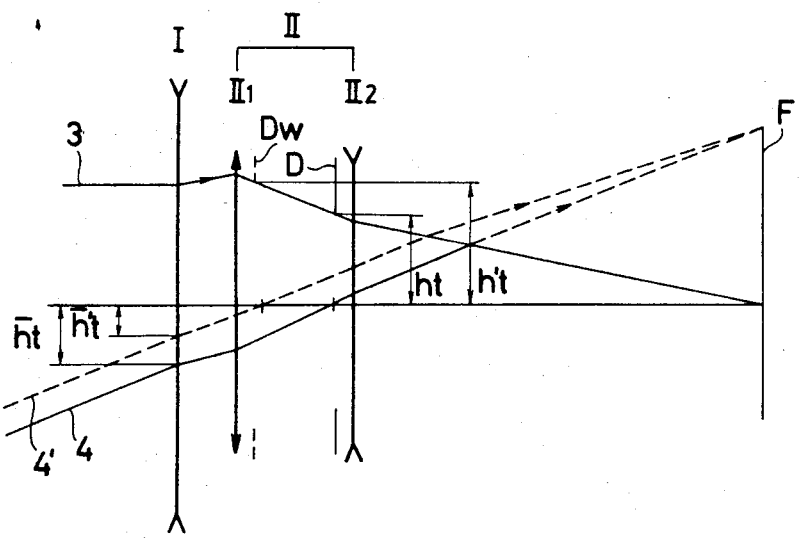
FIG. 2 shows a side view of the embodiment in the telephoto configuration.

In FIG. 1 and FIG. 2, I represents a divergent (negative power) front lens group, while II represents a convergent (positive power) rear lens group, whereby "front" corresponds to the object side, while "rear" corresponds to the image side. Hereby, the rear group consists of a lens group $II_1$ with a strong positive refractive power and a lens $II_2$ with a negative refractive power. This arrangement of the rear lens group provides a position in which the light beam is strongly condensed. The space between the rear lenses is large and is provided with an aperture D movable along the optical axis.

FIG. 1 shows the zoom lens system in its wide angle configuration, while FIG. 2 shows the lens system in its telephoto configuration, whereby in order to increase the focal length the front group I is moved nonlinearly toward the image side, while at the same time, the rear group II is moved linearly toward the object side. The aperture D is designed so as to be close to the positive lens group $II_1$ in the rear group II in the wide angle configuration and to the negative lens group $II_2$ in the rear group in the telephoto configuration, namely the aperture D is moved toward the image side with reference to the rear group II as the focal length is increased.

Below it will be explained that by means of the above composition not only can the F-number in the telephoto configuration can be made small but also the diameter of the frontmost lens in the wide angle configuration can be made small without increasing the aperture diameter.

In FIG. 1, I is the on-axial ray, which is incident on the front group I and is thereby diverged. It thereafter impinges on the positive lens group in the rear group II and is thereby converged. The ray then passes through the aperture at the height hw, and is slightly diverged by means of the negative lens group II$_2$ in the rear group II, thereafter proceeding to the image plane F on the optical axis. Further, 2 is an off-axial ray forming an image at the largest height on the image plane. The off-axial ray passes through the front group at the height $\overline{hw}$ and reaches the image plane F through the rear group.

In FIG. 2, 3 is an on-axial ray. Although the ray is incident upon the image plane at the same angle as the on-axial ray in FIG. 1 the incident height on the front group I is increased due to the increase of the focal length, while the incident height on the rear group II is by far higher than it is in the wide angle configuration because the front and the rear groups are close to each other. Because the aperture D is at the side of the negative lens group II$_2$ in the present embodiment, an on-axial ray 3 is strongly refracted toward the optical axis by means of the positive lens group II$_1$ and then passes through the aperture so that the aperture control mechanism which can be built in a compact lens barrel is sufficient for the height ht.

On the other hand, if the aperture is provided at Dw at the positive lens group II$_1$, the on-axial ray 3 passes at h't by far higher than ht so that the diameter of the aperture has to be larger requiring an enlargement of the lens barrel or preventing the lens barrel from becoming sufficiently large and sacrificing the brightness of the lens.

Further, if the aperture is fixed at the side of the negative lens group II$_2$, namely the aperture is provided at the position Dt in FIG. 1 in the wide angle configuration, the height at which the on-axial ray passes is lowered down to h'w, whereby an aperture control mechanism by means of which the on-axial ray passes at hw must be built in the compact lens barrel. On the contrary, the off-axial ray 2 is moved to the dotted line 2' and the incident height $\overline{hw}$ is increased up to $\overline{h'w}$ so that the diameter of the front lens has to be enlarged.

Further, if the aperture is provided at Dw in FIG. 2 in the telephoto configuration, the off-axial ray passing through the aperture is represented with the dotted line 4'. The incident light is lowered down to $\overline{h't}$ and the diameter of the front lens is decreased. It is, however, far smaller than the diameter of the front lens needed in the wide angle configuration so that no further alterations are necessary.

If, as explained above, the distance between the positive lens group II$_1$ and the negative lens group II$_2$ in the rear group II is enlarged so as to displace the aperture, even in the telephoto configuration it is not necessary to enlarge the F-number, to enlarge the lens barrel, nor to enlarge the diameter of the front lens in the wide angle configuration.

Figure 3:
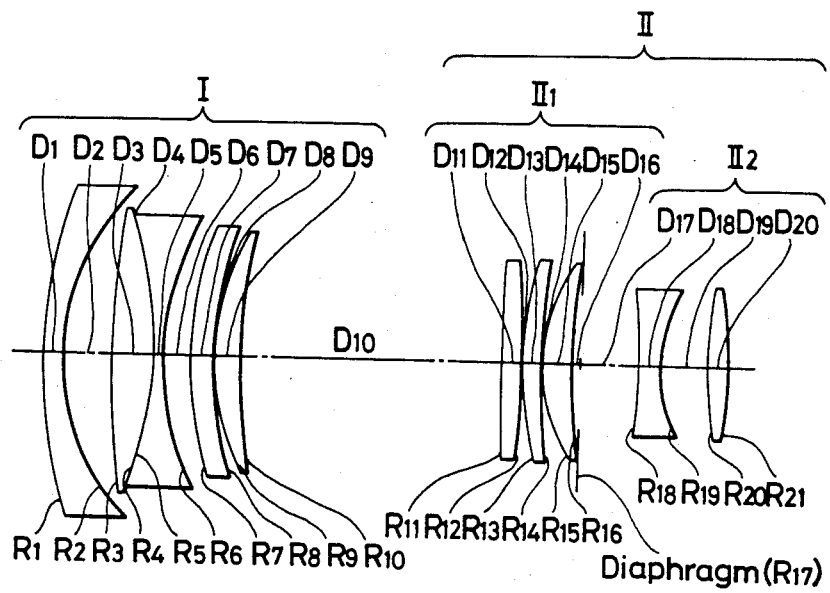
FIG. 3 shows a zoom lens in accordance with the present invention in the wide angle configuration in section.
Figure 4:
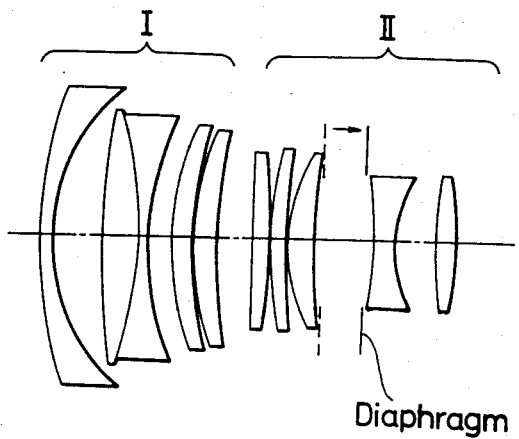
FIG. 4 shows the zoom lens in the telephoto configuration in section.
Figure 5:
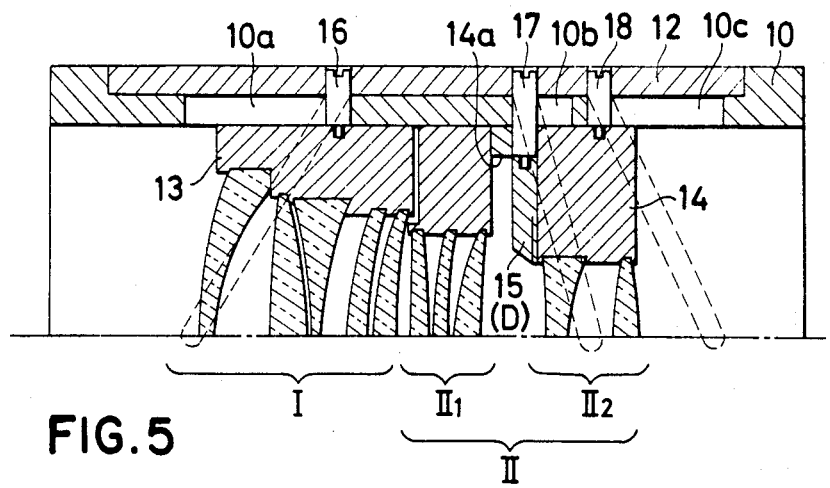
FIG. 5 shows an embodiment of the lens barrel in section.
Figure 6:
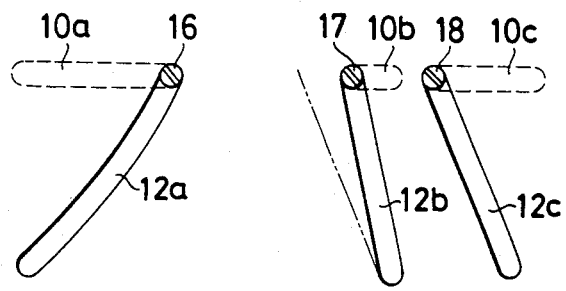
FIG. 6 shows a zooming cam cylinder in development.

The lens whose cross-section in the wide angle configuration is shown in FIG. 3 and whose cross-section in the telephoto configuration is shown in FIG. 4 is the preferred embodiment for practicing the present invention. In this lens a space in which the aperture is movable is provided by enlarging the distance between the positive lenses $R_{15}$, $R_{16}$ and the negative lenses $R_{18}$, $R_{19}$. An embodiment of the mechanism for moving the front group I, the rear group II and the aperture is shown in FIGS. 5 and 6. The numerical data for the lenses will be given later.

In FIG. 5, 10 is a fixed guide cylinder provided with linear cam grooves 10a, 10b and 10c parallel to the optical axis. Further, 12 is a cam cylinder which is rotatable around the optical axis against the guide cylinder, and provided with a non-linear cam groove 12a and linear cam grooves 12b and 12c as shown in development in FIG. 6. The cam groove 12a corresponds to the zooming displacement motion of the front group I, while the cam groove 12c corresponds to the zooming displacement motion of the rear group II. Further, the cam groove 12b is designed in such a manner that the aperture D is close to the negative lens group II$_2$ in the short focal length configuration and to the positive lens group II$_1$ in the long focal length configuration when the rear group II is moved toward the object in order to increase the focal length of the total system.

The front movable cylinder 13, containing the front group I is slidable inside of the guide cylinder 10 along the optical axis, while rear movable cylinder 14 containing the rear group II is slidable inside of the guide cylinder 10 along the optical axis. Further, diaphragm blade holder member 15 is slidable along the guide part 14a of the rear movable cylinder along the optical axis.

The front guide pin 16 is provided on the front movable cylinder 13 and is engaged in the straight cam groove 10a and the non-linear cam groove 12a. The middle guide pin 17 is provided on the diaphragm blade holder member 15 and is engaged in the straight cam groove 10b and the linear cam groove 12b. The rear guide pin 18 is provided on the rear movable cylinder 14 and engaged in the straight cam groove 10a and the linear cam groove 12c.

Consequently, along with the rotation of the cam cylinder 12 the guide pins 16, 17 and 18 move, being controlled with the straight cam groove in the guide cylinder 10 and the cam groove in the cam cylinder 12 in such a manner that the front and the rear groups I and II and the aperture are moved in a predetermined relationship.

Figure 7:
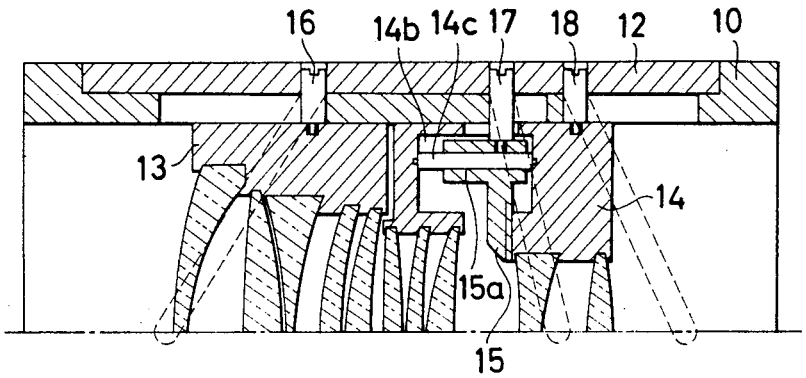
FIG. 7 shows another embodiment of the lens barrel in section.

FIG. 7 shows the mechanism in FIG. 5 with its accuracy by increasing the engaging length of the diaphragm holder member and the rear movable cylinder, whereby the rear movable cylinder 14 is provided with a space 14b in which the guide shaft 14c is secured, while a part of the diaphragm blade holder member 15 is made as a portion 15a to be engaged with the guide shaft 14c so as to be slidable along the axis. If the portion 15a is constructed long enough, the holder member can be displaced with high accuracy.

As will be clear from the above explanation, the F-number in the telephoto configuration can be decreased without enlarging the aperture size of the diaphragm, while when for the same F-number the aperture diameter in the wide angle configuration is different from that in the telephoto configuration it is necessary to provide a control mechanism for varying the aperture diameter along with the displacement of the aperture. In consequence, by properly selecting the convergent degree of the on-axial rays with reference to the distance at which the aperture is provided, the displacement of the aperture and so on it is possible to design a lens which solves the problem that the aperture diameter is same for the same F-number from the wide angle side to the telephoto side.

The lenses whose numerical data are given below are examples of those that solve the above problem. Hereby, Ri is the radius of curvature of the lens surface, Di is the lens thickness or the distance between lenses, ni is the refractive index for d line and νi is the Abbe's number for d line, each corresponding to the lens section in FIGS. 3 and 4.

Figure 8A:
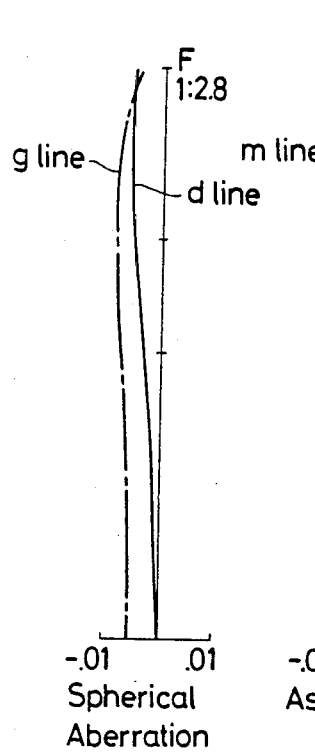
FIGS. 8A-8C show aberrations as lens data of a zoom lens in the wide angle configuration.
Figure 8B:
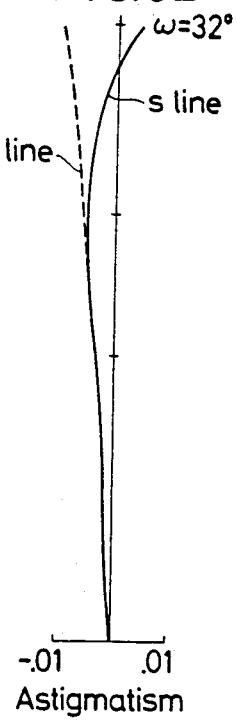
Figure 8C:
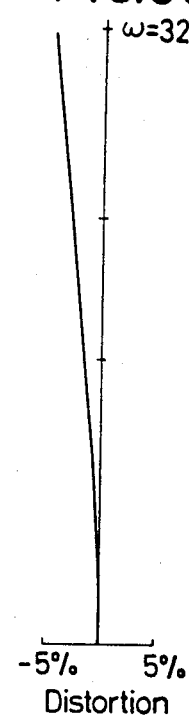
Figure 9A:
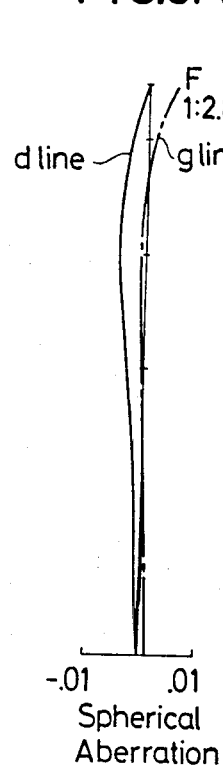
FIGS. 9A-9C show aberrations in the telephoto configuration.
Figure 9B:
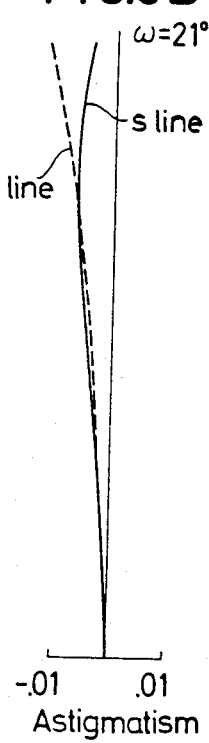
Figure 9C:
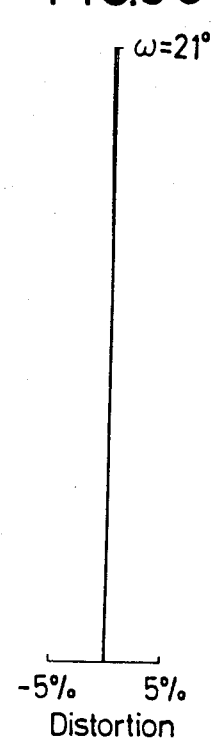

In the following example the aperture diameter is 0.596 for the F-number 1:2.8. Further, the spherical aberration, the astigmatism and the distorsion in wide angle configuration are shown in FIGS. 8A–8C, while those at the telephoto configuration are shown in FIGS. 9A–9C.

| Focal Length f = 1 – 1.586 | | Picture Angle 2ω = 64 – 42° | |
| --- | --- | --- | --- |
| $R_1 = 2.10896$ | $D_1 = 0.06435$ | $n_1 = 1.8061$ | $v_1 = 25.4$ |
| $R_2 = 0.9047$ | $D_2 = 0.22807$ | | |
| $R_3 = 5.0260$ | $D_3 = 0.16786$ | $n_2 = 1.61293$ | $v_2 = 37.$ |
| $R_4 = -1.73211$ | $D_4 = 0.00560$ | | |
| $R_5 = -1.89286$ | $D_5 = 0.04196$ | $n_3 = 1.713$ | $v_3 = 53.9$ |
| $R_6 = 1.27556$ | $D_6 = 0.11095$ | | |
| $R_7 = 1.46504$ | $D_7 = 0.09792$ | $n_4 = 1.71736$ | $v_4 = 29.5$ |
| $R_8 = 1.86587$ | $D_8 = 0.00280$ | | |
| $R_9 = 1.30302$ | $D_9 = 0.11190$ | $n_5 = 1.74077$ | $v_5 = 27.8$ |
| $R_{10} = 2.85805$ | $D_{10} = 1.11562 \sim 0.16443$ | | |
| $R_{11} = 26.66649$ | $D_{11} = 0.08393$ | $n_6 = 1.713$ | $v_6 = 53.9$ |
| $R_{12} = -4.38342$ | $D_{12} = 0.00280$ | | |
| $R_{13} = 1.59713$ | $D_{13} = 0.08393$ | $n_7 = 1.713$ | $v_7 = 53.9$ |
| $R_{14} = 4.14978$ | $D_{14} = 0.00280$ | | |
| $R_{15} = 0.83574$ | $D_{15} = 0.12589$ | $n_8 = 1.713$ | $v_8 = 53.9$ |
| $R_{16} = 4.19642$ | $D_{16} = 0.03637 \sim 0.23500$ | | |
| $R_{17} = $ (Aperture) | $D_{17} = 0.22940 \sim 0.03077$ | | |
| $R_{18} = -3.25410$ | $D_{18} = 0.09745$ | $n_9 = 1.8061$ | $v_9 = 25.4$ |
| $R_{19} = 0.63899$ | $D_{19} = 0.19795$ | | |
| $R_{20} = 1.98222$ | $D_{20} = 0.10351$ | $n_{10} = 1.713$ | $v_{10} = 53.9$ |
| $R_{21} = -1.20997$ | | | |

What is claimed is:

1. A zoom lens system comprising:
   a front lens group;
   a rear lens group being arranged closer to the image side than said front lens group and comprising first and second sub-groups separated from each other with an air-gap;
   a diaphragm arranged between said first and second subgroups for determining the F-number of said zoom lens system; and
   control means for driving the front and the rear lens groups independently from each other along the optical axis during zooming and for driving said diaphragm along the optical axis relative to said rear lens.

2. A zoom lens system in accordance with claim 1, wherein said front lens group has a negative power, said rear lens group has a positive power, said first sub-group is sufficiently convergent to convert a divergent light beam into a convergent beam and said diaphragm is moved from a position closest to said first sub-group to an alternate position closest to the second sub-group by the control means as the focal length of said zoom lens system becomes longer.

3. A zoom lens system in accordance with claim 2, wherein said first sub-group includes at least three positive lenses.

4. A zoom lens system in accordance with claim 2, wherein said control means includes cams for respectively controlling the displacement of the front and the rear lens group and the diaphragm.

5. A zoom lens system in accordance with claim 1, wherein said front lens group has a negative power, said rear lens group has a positive power, said first sub-group has a positive power, and said second sub-group has a negative power, whereby the diaphragm is close to said first sub-group when the focal length of the total system is short and close to the second sub-group when the focal length of the total system is long, while during zooming the aperture size of said diaphragm is maintained constant for the same F-number of said zoom lens system.

6. A zoom lens system comprising:
   a front lens group;
   a rear lens group arranged closer to the image side than said front lens group and including a sub-group;
   a diaphragm arranged closer to the object side than said sub-group for determining the F-number of said zoom lens system; and
   driving means for displacing the front and the rear lens group independently from each other during zooming and for displacing the diaphragm independently from the rear lens group.

7. A zoom lens system in accordance with claim 6, wherein the front lens group has a negative power, while the rear lens group has a positive power and comprises two sub-groups, the diaphragm being arranged between said two sub-groups.

8. A zoom lens system in accordance with claim 7, wherein the sub-group arranged closer to the object side than the diaphragm has a positive power, while the other sub-group has a negative power.

9. A zoom lens system in accordance with claim 6, wherein in order to increase the focal length of the total system, said front lens group is displaced toward the image side, said rear lens group is displaced toward the object side and said diaphragm is displaced toward the object side at a speed lower than that of the rear lens group.

* * * * *